United States Patent
Francus et al.

(10) Patent No.: US 10,232,780 B1
(45) Date of Patent: Mar. 19, 2019

(54) VEHICLE CAMERA COVER ASSEMBLY

(71) Applicant: Nissan North America, Inc., Franklin, TN (US)

(72) Inventors: Neil Francus, Plymouth, MI (US); Chhay Chau, Wolverine Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/793,219

(22) Filed: Oct. 25, 2017

(51) Int. Cl.
   *B60R 1/12*       (2006.01)
   *B60R 1/04*       (2006.01)

(52) U.S. Cl.
   CPC ............... *B60R 1/12* (2013.01); *B60R 1/04* (2013.01); *B60R 2001/1253* (2013.01)

(58) Field of Classification Search
   CPC ..... B60R 1/12; B60R 1/04; B60R 2001/1253; B60R 11/04
   USPC ................................................ 296/1.11, 37.8
   See application file for complete search history.

(56) References Cited

U.S. PATENT DOCUMENTS

| | | | |
|---|---|---|---|
| 9,090,213 B2 * | 7/2015 | Lawlor | ..................... B60R 1/12 |
| 9,352,692 B2 * | 5/2016 | Uken | ................... H04N 5/2257 |
| 2016/0229346 A1 * | 8/2016 | Oh | ............................ B60R 1/12 |

* cited by examiner

*Primary Examiner* — Pinel E Romain
(74) *Attorney, Agent, or Firm* — Global IP Counselors, LLP

(57) ABSTRACT

A vehicle camera cover assembly includes a base bracket, an upper cover and a lower cover. The upper cover has an upper attachment section that aligns with and attaches to a first attachment section of the base bracket. The upper cover has a retention flange dimensioned and positioned to overlay an inner flange of the base bracket with the upper cover attached to the base bracket. The lower cover has a lower attachment section that removably connects to a second attachment section of the base bracket. The lower cover has an outer flange dimensioned and positioned such that with the upper cover and the lower cover installed to the base bracket, the outer flange covers and contacts the retention flange thereby confining the retention flange between the outer flange and the inner flange restricting movement of the upper cover relative to the lower cover and the base bracket.

20 Claims, 8 Drawing Sheets

US 10,232,780 B1

VEHICLE CAMERA COVER ASSEMBLY

BACKGROUND

Field of the Invention

The present invention generally relates to a camera cover assembly. More specifically, the present invention relates to camera cover assembly with interlocking flanges that retain the cover to an interior surface windshield of a vehicle.

Background Information

Many vehicles include cameras, including a camera aimed at areas forward of the vehicle. The camera can be installed along an interior surface of a windshield adjacent to a rear-view mirror.

SUMMARY

One object of the present disclosure is to provide an interior surface of a vehicle windshield with a camera cover with a secure connection between adjacent portions of the camera cover.

In view of the state of the known technology, one aspect of the present disclosure is to provide a vehicle camera cover assembly with a base bracket, an upper cover and a lower cover. The base bracket has a windshield attachment surface and a cover attachment surface opposite the windshield attachment surface. The base bracket defines an opening dimensioned to encircle a base member of a rear-view mirror. The cover attachment surface has an upper portion with a first attachment section, a lower portion with a second attachment section and mid-portion with an inner flange extending therefrom at a location spaced apart from the first attachment section and the second attachment section. The upper cover has an upper attachment section that aligns with and attaches to the first attachment section. The upper cover has a retention flange extending from one end thereof dimensioned and positioned to overlay the inner flange of the base bracket with the upper cover attached to the base bracket. The lower cover has a lower attachment section that aligns with and removably connects to the second attachment section. The lower cover has an outer flange dimensioned and positioned such that with the upper cover and the lower cover installed to the base bracket, the outer flange covers and contacts the retention flange thereby confining the retention flange between the outer flange and the inner flange restricting movement of the upper cover relative to the lower cover and the base bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
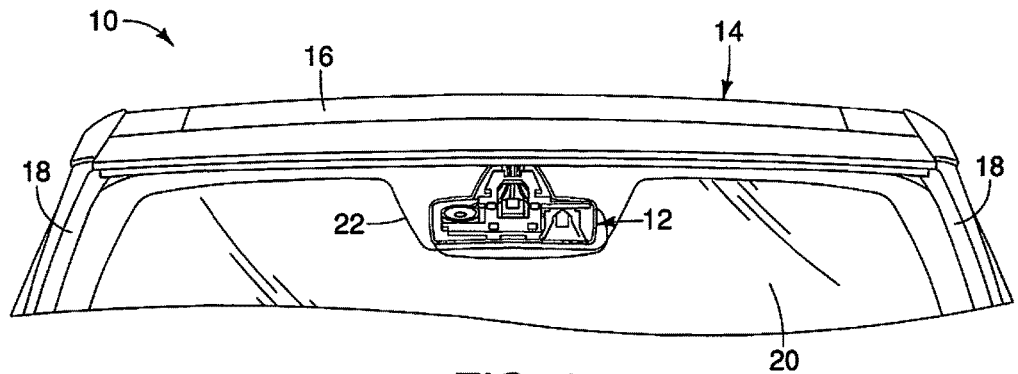
FIG. 1 is a front view of an upper portion of a vehicle showing a windshield with a darkened area (shown in outline so that concealed features below it are revealed) that conceals a camera, an optional rain sensor and a rear-view mirror attached to an interior surface of the windshield, the camera being concealed from the interior of the vehicle by a camera cover assembly in accordance with an embodiment.
Figure 2:
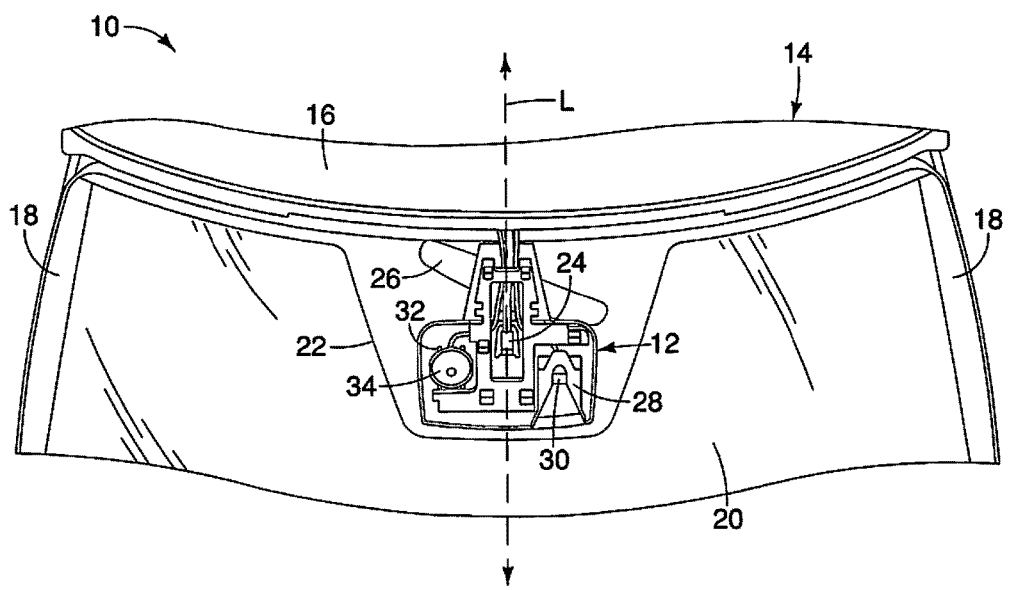
FIG. 2 is a perspective view looking downward at the upper portion of the vehicle showing the darkened area of the windshield, the camera and the rear-view mirror attached to the interior surface of the windshield, and the camera cover assembly in accordance with the embodiment.

Referring initially to FIGS. 1 and 2, a vehicle 10 having a vehicle camera cover assembly 12 is illustrated in accordance with a first embodiment.

The vehicle 10 includes a vehicle body structure 14 that has a roof structure 16 supported by, among other structural features, a pair of A-pillars 18. A windshield 20 is installed below the roof structure 16 and between the A-pillars 18. The windshield 20 is manufactured with a darkened area 22 that prevents light from passing therethrough and eliminates the transparent properties of the glass of the windshield 20 in the areas covered by the darkened area 22. The darkened area 22 is a conventional vehicle windshield feature that is preferably applied adjacent to peripheral edges of the windshield 20. The darkened area 22 can be deliberately shaped and dimensioned to correspond to and complement design features of the vehicle 10. The darkened area 22 can be any of a variety of glass adhering coatings, and is applied to one of the surfaces, such as the interior surface or exterior surface, of the glass of the windshield 20, depending upon the design of the vehicle 10 and the material used to form the darkened area 22.

Figure 3:
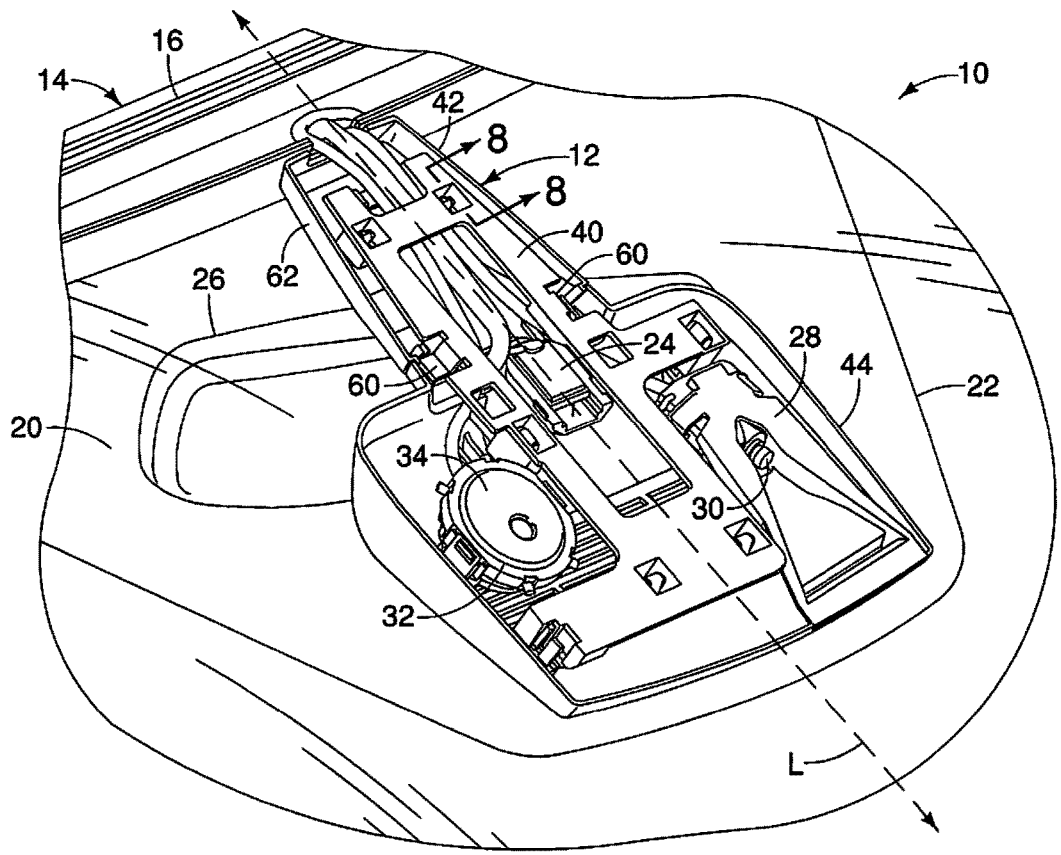
FIG. 3 is another perspective view showing the darkened area of the windshield, the camera and the rear-view mirror attached to the interior surface of the windshield, and the camera cover assembly in accordance with the embodiment.
Figure 14:
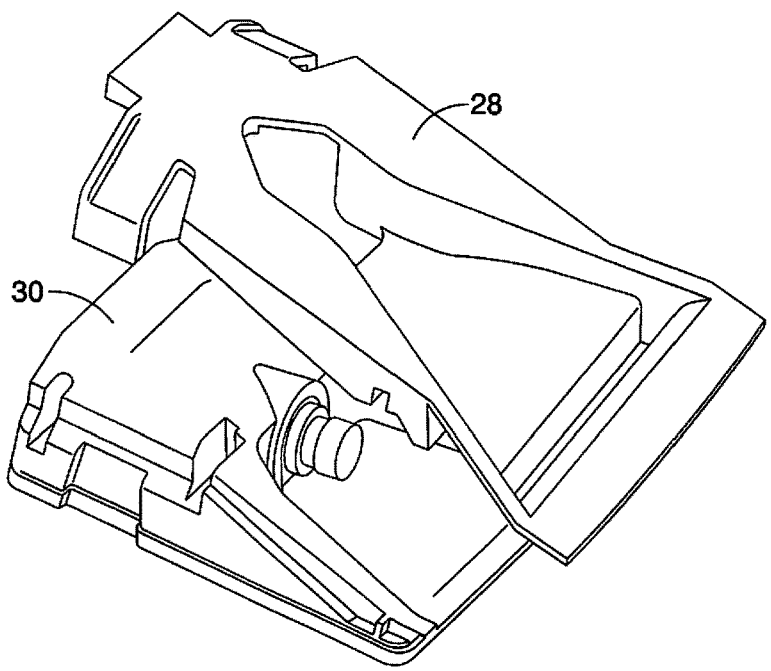
FIG. 14 is an exploded perspective view showing the camera bracket and the camera in accordance with the embodiment.
Figure 15:
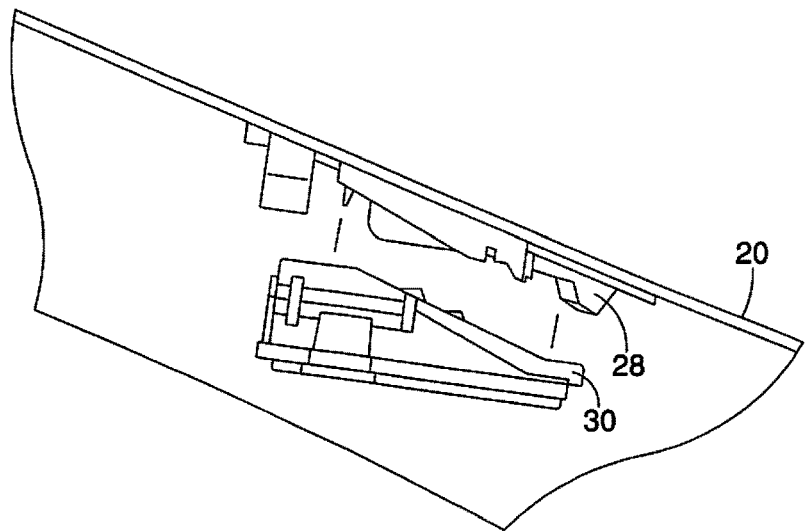
FIG. 15 is an exploded side view showing the camera and the camera bracket with the camera bracket attached to the interior surface of the windshield in accordance with the embodiment.
Figure 16:
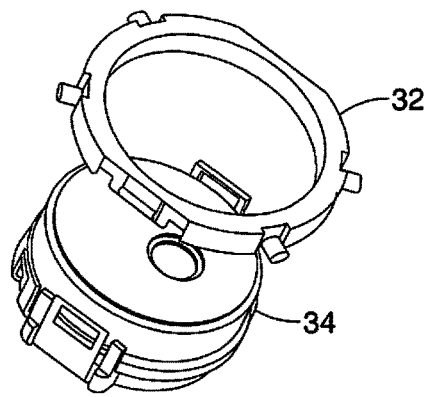
FIG. 16 is an exploded perspective view showing the rain sensor bracket and the rain sensor in accordance with the embodiment.
Figure 17:
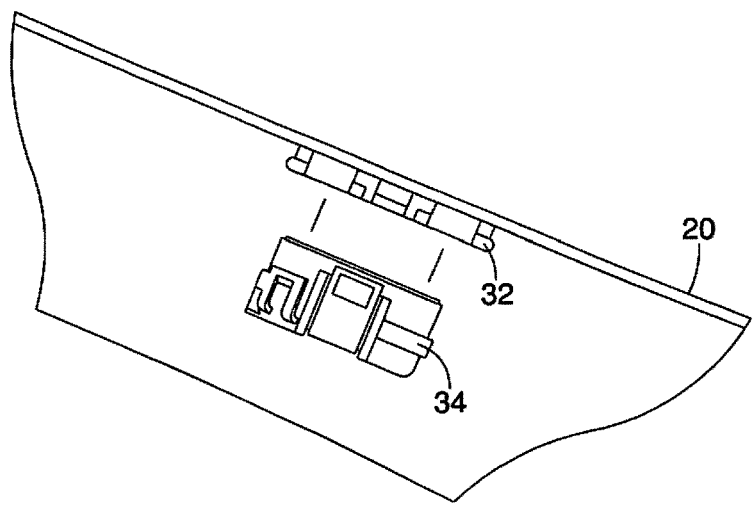
FIG. 17 is an exploded side view showing the rain sensor and the rain sensor bracket with the rain sensor bracket attached to the interior surface of the windshield in accordance with the embodiment.

In FIGS. 1 and 2, for the purpose showing features described herein below, the darkened area 22 is merely shown in outline form and is made transparent revealing features that are normally concealed. However, it should be understood from the drawings and the description herein, that the darkened area 22 is not transparent. More specifically, the darkened area 22 conceals features installed to the interior surface of the glass of the windshield 20 such as: a base member 24 used to secure a rear-view mirror 26; a camera bracket 28 used to secure a camera 30 (FIGS. 3, 14 and 15); and a rain sensor bracket 32 used to secure an optional rain sensor 34 (FIGS. 3, 16 and 17). In the depicted embodiment, the darkened area 22 covers and conceals the base member 24, the camera bracket 28 and the rain sensor bracket 32. Hence, the darkened area 22 at least partially conceals the base member 24, the camera bracket 28 and the rain sensor bracket 32 from being seen from outside the vehicle 10 looking into the vehicle 10 through the windshield 20. The vehicle camera cover assembly 12 is installed along the interior surface of the windshield 20 covering and concealing the base member 24, the camera bracket 28, the camera 30, the rain sensor bracket 32 and the rain sensor 34 preventing them from being seen by a person standing outside the vehicle 10, as is described in greater detail below.

It should be understood from the drawings and the description herein, that the darkened area 22 can include small gaps or openings at predetermined locations. For example, in an area corresponding to the camera bracket 28, the darkened area 22 can include a small opening, or blank space (not shown) that provides the camera 30 with a window to capture images outside the vehicle 10 through the windshield 20. A similar gap or opening (not shown) can be provided in the darkened area 22 to allow sensing by the optional rain sensor 34.

As shown in FIG. 3, the rear-view mirror 26 is installed to the base member 24, and hence to the windshield 20. As well, the camera 28 is installed to the camera bracket 28 (also see FIGS. 14 and 15), and hence to the windshield 20. Further, the optional rain sensor 34 can be installed to the rain sensor bracket 32 (also see FIGS. 16 and 17), and hence to the windshield 20. The rear-view mirror 26, the camera 28 and the optional rain sensor 34 are conventional vehicle elements and therefore further description is omitted for the sake of brevity.

As is also shown in FIG. 3, the vehicle camera cover assembly 12 includes a base bracket 40, an upper cover 42 and a lower cover 44 that are described in greater detail below. When fully assembled to the vehicle 10 and to each other, the base bracket 40, the upper cover 42 and the lower cover 44 define a longitudinal direction L that coincides with a vehicle longitudinal direction, as shown in FIGS. 1 and 3. Further, when fully assembled to the vehicle 10 and to each other, the base bracket 40, the upper cover 42 and the lower cover 44 cover and at least partially conceal the camera 28 and the optional rain sensor 34 from view within the vehicle 10.

Figure 4:
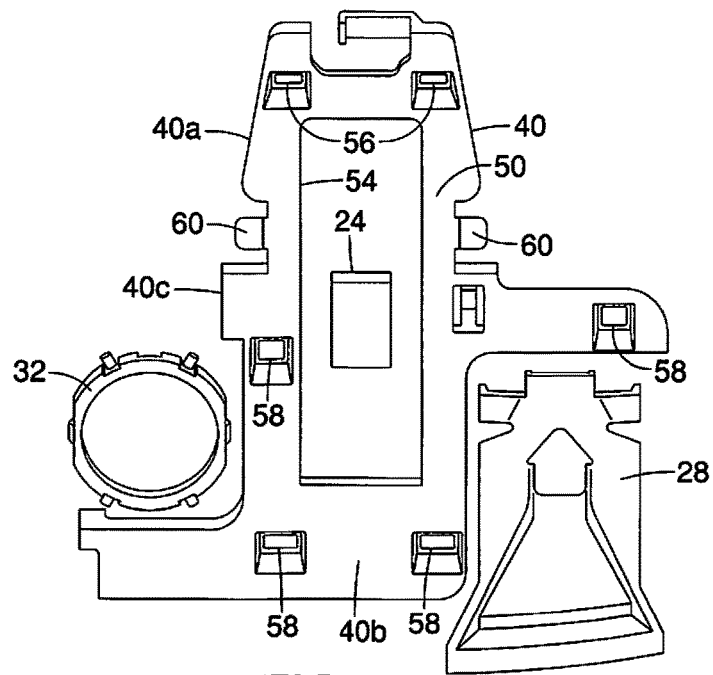
FIG. 4 is a top view of a base bracket of the camera cover assembly, a camera bracket and a rain sensor bracket arranged together as installed to the interior surface of the windshield in accordance with the embodiment.

FIG. 4 shows the base member 24, the camera bracket 28, the rain sensor bracket 32 and the base bracket 40 in positions corresponding to their installation locations on the inner surface of the windshield 20. Typically, the base member 24, the camera bracket 28 and the rain sensor bracket 32 are installed to the windshield 20 prior to installation of the windshield 20 to the vehicle body structure 14. The base member 24, the camera bracket 28 and the rain sensor bracket 32 are preferably fixed to the windshield 20 using one of a variety of adhesive material suitable for adhering plastic and/or metal to glass. The base bracket 40 can also be installed to the interior surface of the windshield 20 using adhesive material prior to installation of the windshield 32, or can be installed after installation of the windshield 32 to the vehicle 10.

A description of the vehicle camera cover assembly 12 is now provided with specific reference to FIGS. 2-13.

Figure 5:
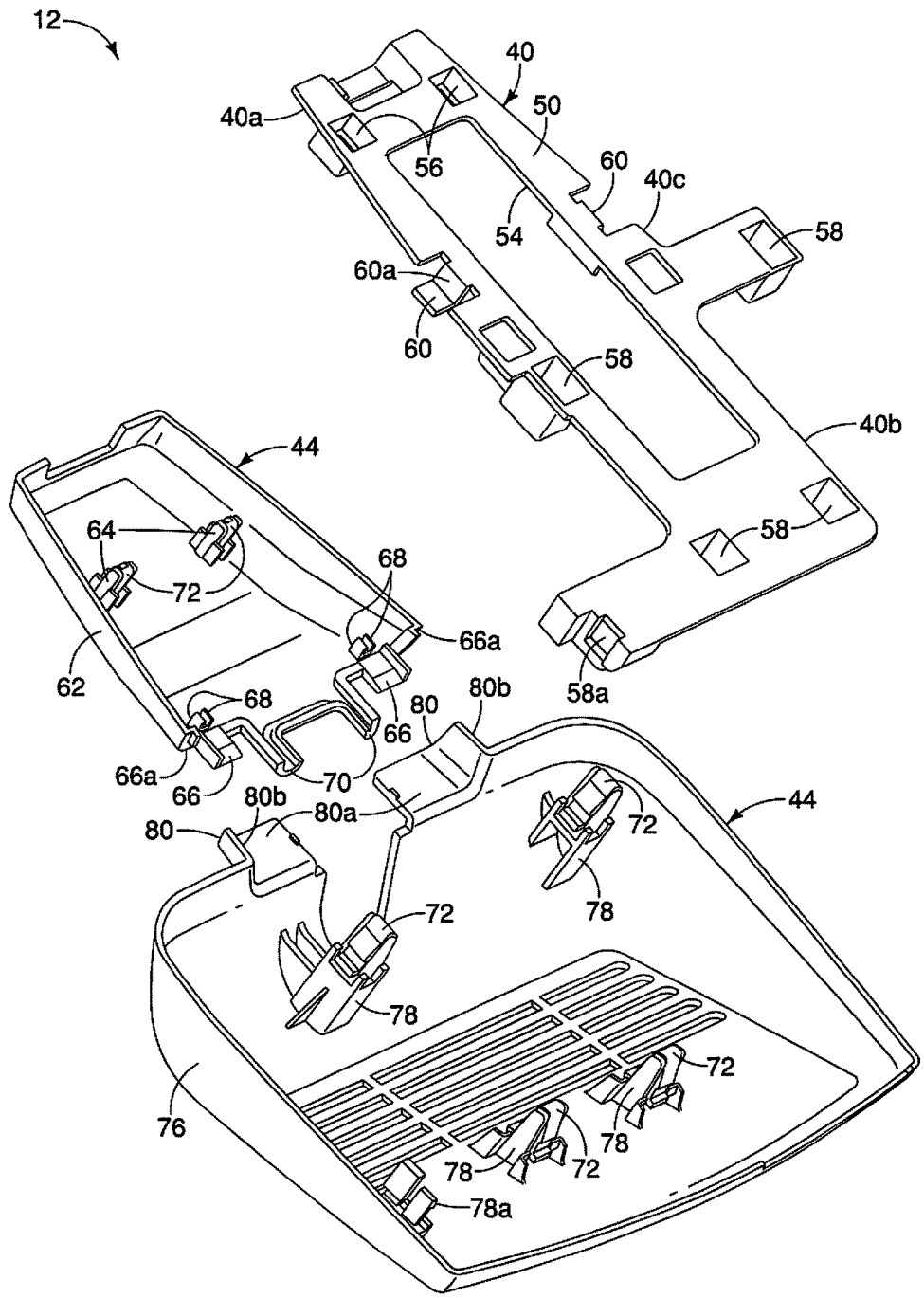
FIG. 5 is an exploded perspective view of the camera cover assembly showing the base bracket, an upper cover and a lower cover in accordance with the embodiment.
Figure 6:
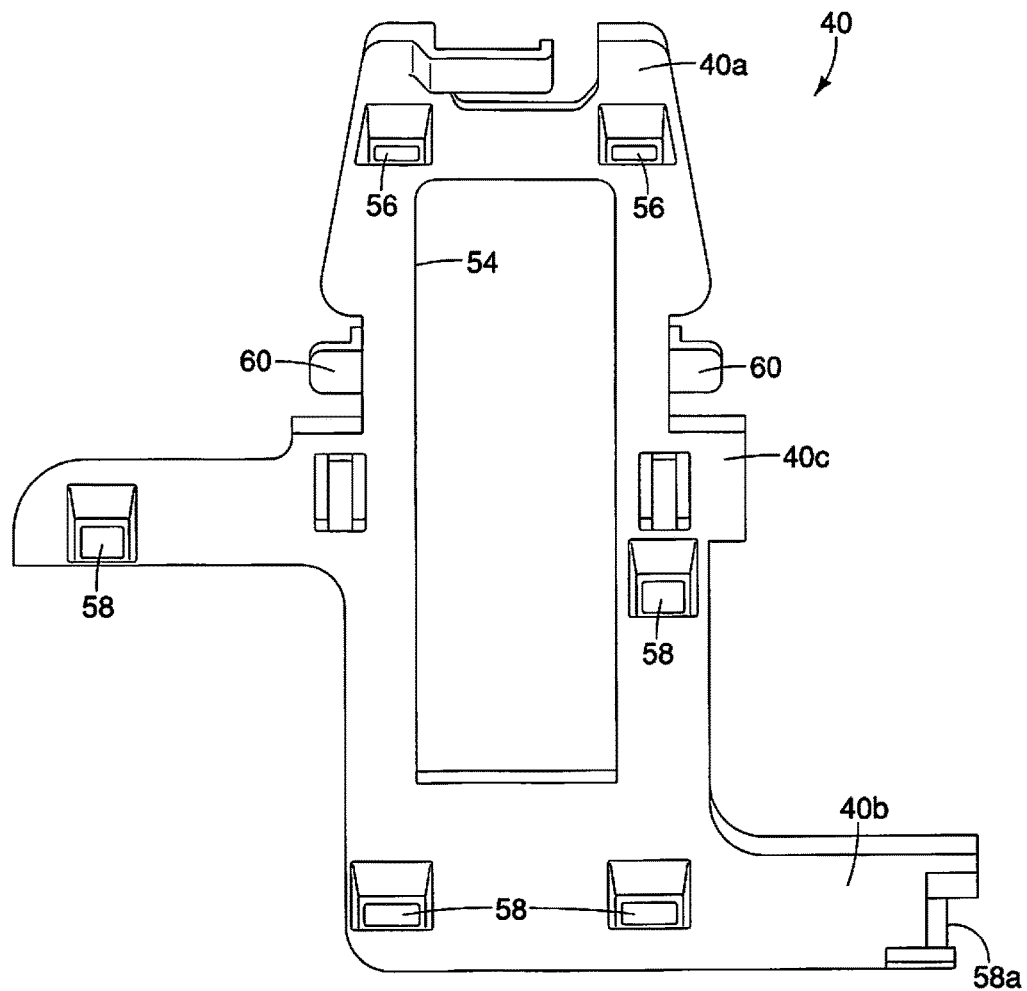
FIG. 6 is a top view of the base bracket of the camera cover assembly, the camera bracket and the rain sensor bracket shown removed from the windshield, shown in relative positions corresponding to installation to the interior surface of the windshield in accordance with the embodiment.

As shown in FIGS. 4, 5 and 6, the base bracket 40 has a windshield attachment surface 50 and a cover attachment surface 52 opposite the windshield attachment surface 50. The windshield attachment surface 50 is approximately planar. However, the base bracket 40 is made of a flexible, plastic or polymer material and can flex when attached to the windshield 20. If the windshield 20 includes a slight curvature, then the base bracket 40 flexes and conforms to the shape of the windshield 20.

The base bracket 40 defines an opening 54 that is dimensioned to encircle or surround the base member 24 of the rear-view mirror 26 when attached to the interior surface of the windshield 20. The cover attachment surface 52 has an upper portion 40a with two first attachment sections 56, a lower portion 40b with lower attachment sections 58 and a mid-portion 40c with a pair of inner flanges 60. The inner flanges 60 extend from the mid-portion 40c at a location spaced apart from the first attachment sections 56 and the lower attachment sections 58. The opening 54 is located between the inner flanges 60.

The first attachment sections 56 can be any of a variety of attachment structures that include or receive corresponding snap-fitting attachment structures. In the depicted embodiment, the first attachment sections 56 are hollow projections referred to as two doghouse structures. Similarly, the lower attachment sections 58 can be any of a variety of attachment structures that include or receive corresponding snap-fitting attachment structures. In the depicted embodiment, the lower attachment sections 58 are hollow projections referred to as two doghouse structures. Since doghouse structures are conventional structures, further description is omitted for the sake of brevity.

As shown in FIGS. 5 and 10-13, each of the pair of inner flanges 60 of the base bracket 40 includes an extending portion 60a and a pressing surface 60b. The extending portion 60a extends away from the windshield attachment surface 50. The pressing surface 60b extends from a distal end of the extending portion 60a in a direction parallel to the windshield attachment surface 50.

As shown in FIG. 5, the upper cover 42 includes a trim surface 62, two upper attachment sections 64, a pair of retention flanges 66, stop projections 68 and alignment projections 70. The trim surface 62 can have any of a variety of appearances and/or cover materials and textures, depending upon the design requirements of the interior of the vehicle 10.

Figure 7:
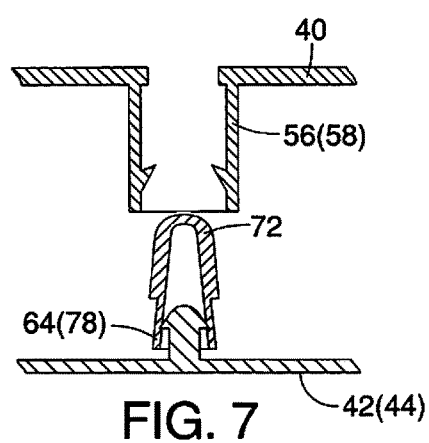
FIG. 7 is a cross-sectional side view of attachment sections of the base bracket and the upper cover (or the lower cover) shown with the upper cover detached from the base bracket in accordance with the embodiment.
Figure 8:
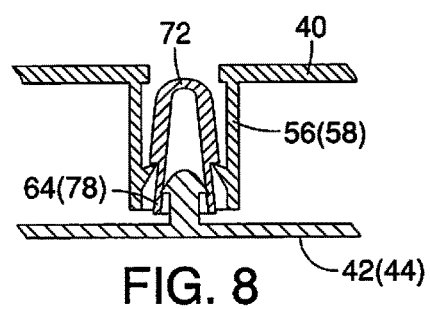
FIG. 8 is a cross-sectional side view of the attachment sections of the base bracket and the upper cover (or the lower cover) taken along the line 8-8 in FIG. 3, shown with the upper cover installed to the base bracket in accordance with the embodiment.

As shown in FIGS. 5, 7 and 8, each of the two upper attachment sections 64 are basically projections that include a snap fitting member 72. When the upper cover 42 is fitted to and attached to the base bracket 40, the upper attachment sections 64 align with and attach (snap-fit) to the doghouse structures that defines the first attachment sections 56, as shown in FIGS. 7 and 8.

Figure 10:
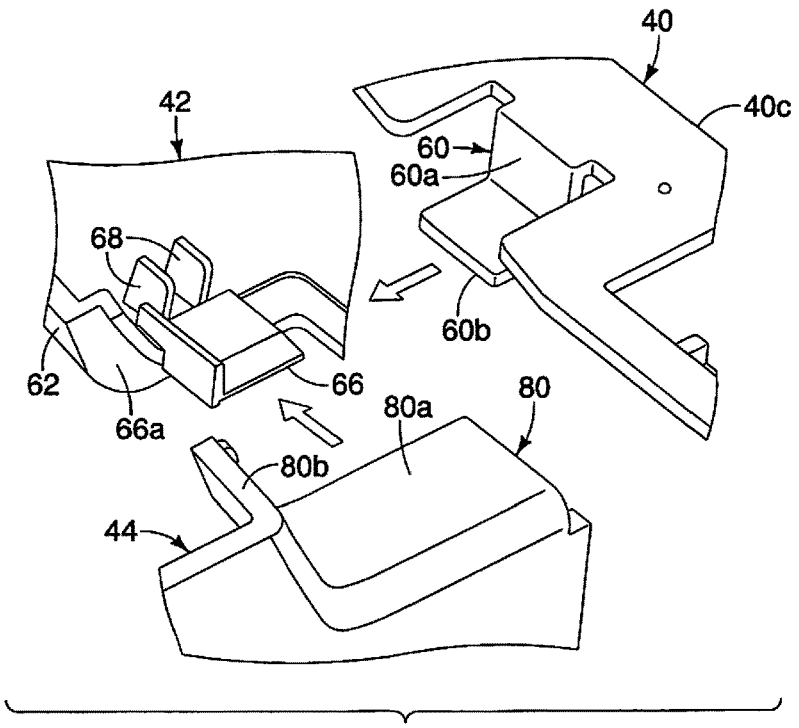
FIG. 10 is an exploded perspective view of an inner flange of the base bracket, a retention flange of the upper cover and an outer flange of the lower cover shown detached from one another in accordance with the embodiment.
Figure 11:
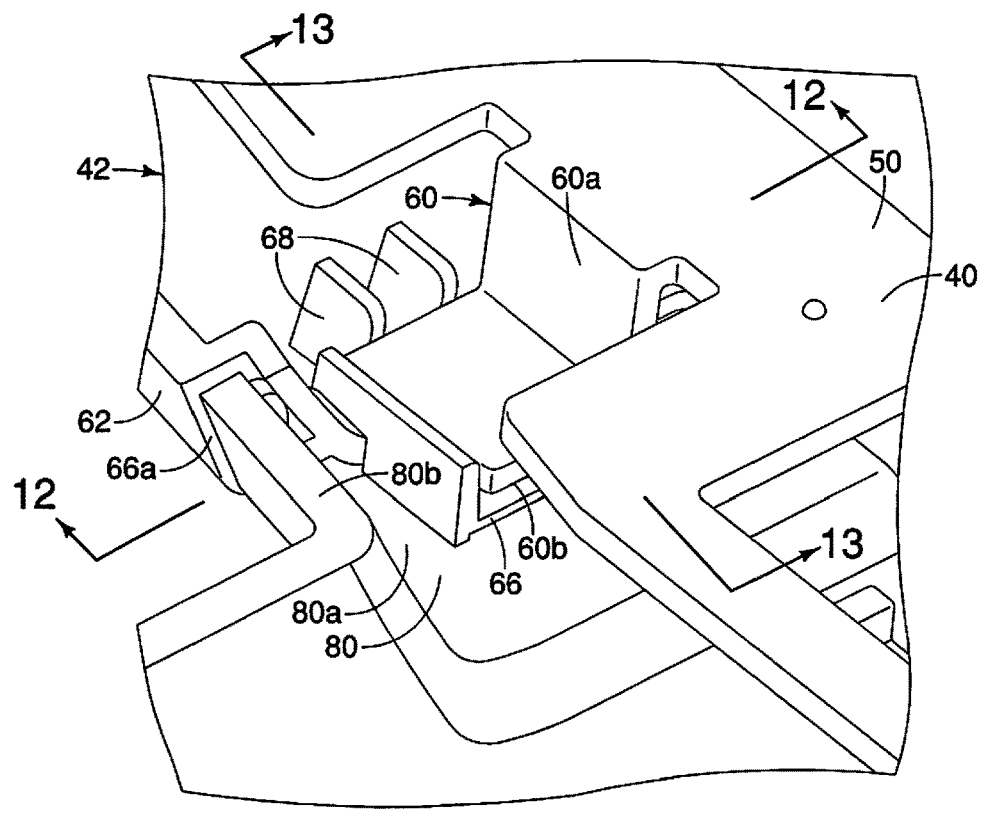
FIG. 11 is a perspective view of the inner flange of the base bracket, the retention flange of the upper cover and the outer flange of the lower cover shown with the upper cover and the lower cover attached to the base bracket in accordance with the embodiment.
Figure 12:
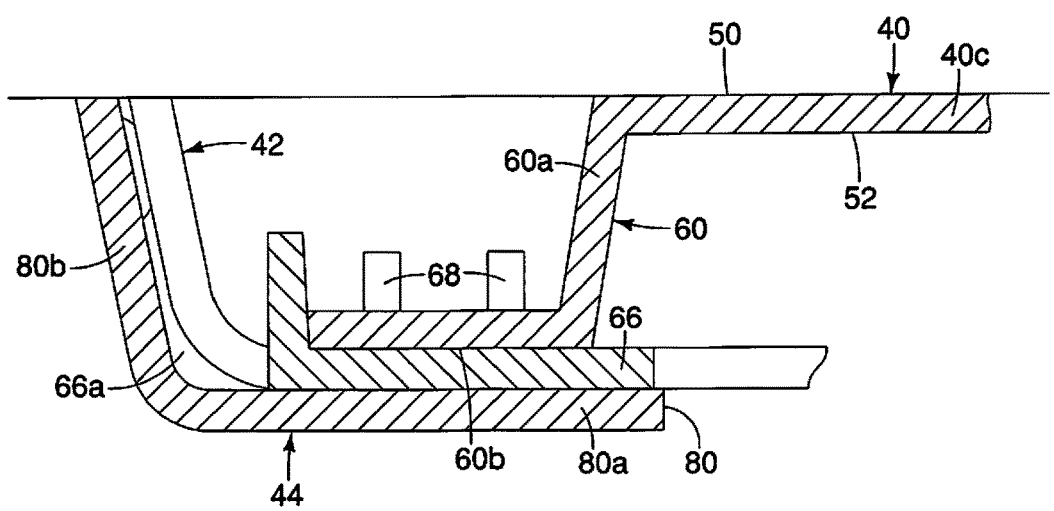
FIG. 12 is a cross-sectional view taken along the line 12-12 in FIG. 11, showing the inner flange of the base bracket, the retention flange of the upper cover and the outer flange of the lower cover shown with the upper cover and the lower cover attached to the base bracket in accordance with the embodiment.
Figure 13:
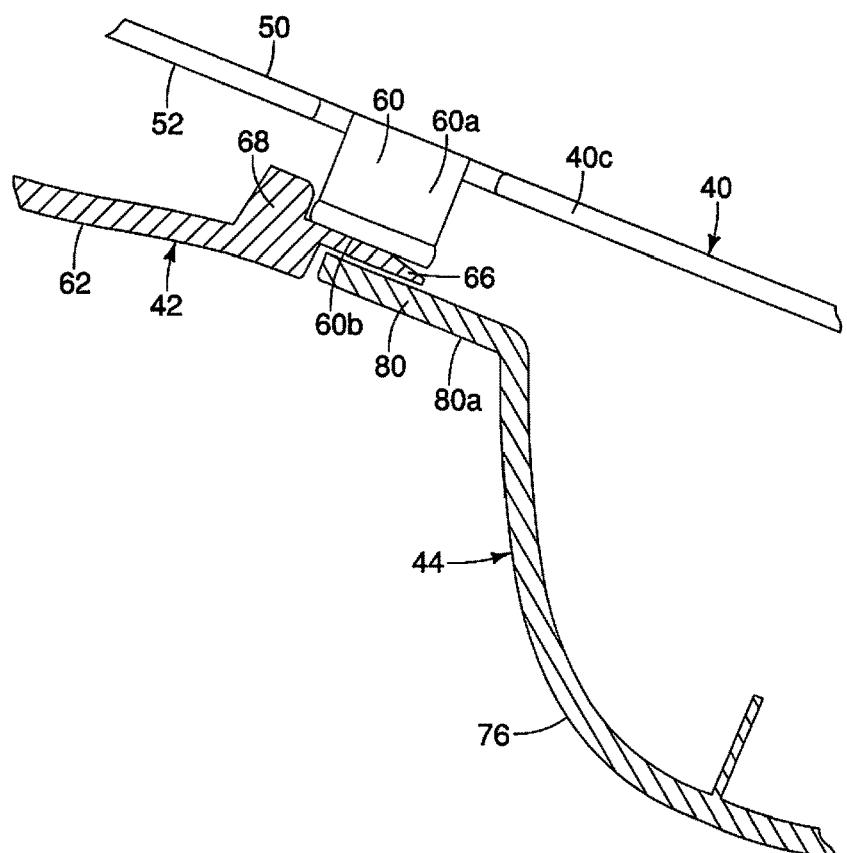
FIG. 13 is a cross-sectional view taken along the line 13-13 in FIG. 11, showing the inner flange of the base bracket, the retention flange of the upper cover and the outer flange of the lower cover shown with the upper cover and the lower cover attached to the base bracket in accordance with the embodiment.

As shown in FIGS. 5 and 9-13, the pair of retention flanges 66 that extend from a lower edge of the upper cover 42. The pair of retention flanges 66 are spaced apart from one another and are dimensioned and positioned to overlay corresponding ones of the pair of inner flanges 60 of the base bracket 40 with the upper cover 42 attached to the base bracket 40, as shown in FIGS. 12 and 13.

The stop projections 68 extend from the upper cover 42 away from the trim surface 62 and are located adjacent to respective ones of the retention flanges 66. The stop projections 68 are positioned to contact respective ones of the inner flanges 60 of the base bracket 40. The stop projections 68 are configured to limit and/or prevent forward movement of the upper cover 42 in the vehicle longitudinal direction L when installed to the base bracket 40, and to limit movement of the upper cover 42 relative to the base bracket 40. The alignment projections 70 extend in directions parallel to the retention flanges 66 and define a gap therebetween that receives a portion of the rear-view mirror 26.

As shown in FIG. 5, the lower cover 44 also has a trim surface 76, a plurality of lower attachment sections 78 and 78a and a pair of outer flanges 80 with a gap G defined between the outer flanges 80. Like the trim surface 62 of the upper cover 42, the trim surface 76 can have any of a variety of appearances and/or cover materials and textures, depending upon the design requirements of the interior of the vehicle 10.

As shown in FIGS. 5, 7 and 8, each of the lower attachment sections 78 are basically projections that include a snap fitting member 72. When the lower cover 44 is fitted to and attached to the base bracket 40, the lower attachment sections 78 align with and attach (snap-fit) to the doghouse structures that defines the second attachment sections 58, as shown in FIGS. 7 and 8. The lower attachment section 78a snap-fits to the lower attachment section 58a of the base bracket 40.

As shown in FIGS. 5 and 9-13, the pair of outer flanges 80 that extend from an upper edge of the lower cover 44. The pair of outer flanges 80 are spaced apart from one another and are dimensioned and positioned to contact and cover corresponding ones of the pair of retention flanges 66 of the upper cover 42 with the upper cover 42 and the lower cover 44 attached to the base bracket 40, as shown in FIGS. 3, 9 and 11-13.

Upper edges of the outer flanges 80 contact and mate with recesses 66a of the upper cover 42. As shown in FIGS. 10 and 11, the retention flanges 66 are offset from the trim surface 62, thereby defining the recesses 66a. The gap G is dimensioned and located such that the alignment projections 70 extend along opposite sides of the gap G that receives the portion of the rear-view mirror 26.

Figure 9:
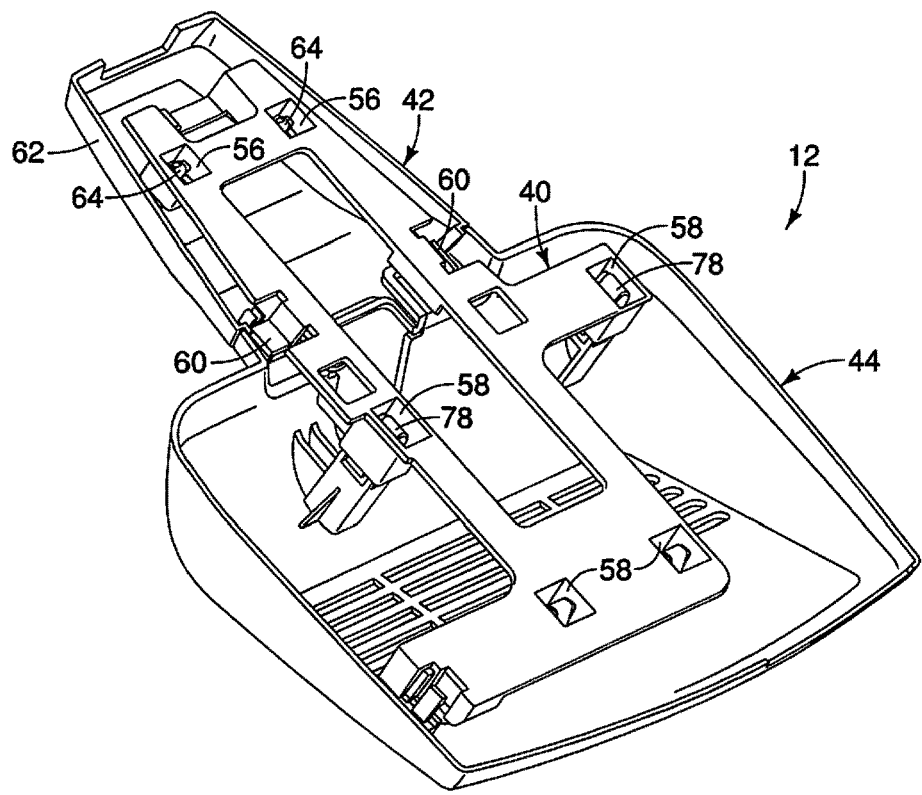
FIG. 9 is a perspective view of the camera cover assembly showing the base bracket, an upper cover and a lower cover attached to one another in accordance with the embodiment.

The base bracket 40, the upper cover 42 and the lower cover 44 are configured such that when attached to one another, the outer flanges 80 contacts, partially cups and covers the retention flanges 66 thereby confining the retention flange 66 between the outer flanges 80 restricting movement lateral movement of the upper cover 42 relative to the lower cover 44 and the base bracket 40. Further, the pressing surfaces 60b of each of the inner flanges 60 contact and press against the retention flanges 66, sandwiching the retention flanges 66 between the inner flanges 60 and the outer flanges 80, as shown in FIGS. 9 and 11.

Each of the outer flanges 80 of the lower cover 44 has main portion 80a that extends in the longitudinal direction L and a lateral side portion 80b that extends away from the main portion 80a curving around an outer lateral edge of the retention flanges 66, as shown in FIGS. 10 and 11. Consequently, the main portions 80a prevent vertical movement of the retention flanges 66 and the lateral side portions 80b prevent movement in lateral directions.

Although not shown, there are wires connecting the camera 30 and the rain sensor 34 to an electronic controller (not shown) such that the electronic controller can process, record and/or display images and data from the camera 30 and the rain sensor 34. When attached to the interior surface 20a of the windshield, the camera cover assembly 12 covers and conceals the camera 30, the rain sensor 34 and the wires extending therefrom. Further, the rear-view mirror 26 extends from the base member 24 through the gap G defined between the outer flanges 80 of the lower cover 42 and between the alignment projections 70 of the upper cover 42. The trim surface 62 of the upper cover 42 and the trim surface 76 of the lower cover 44 provide an appearance that can be coordinated with the design of the interior of the vehicle 10, thereby providing a desired look above the rear-view mirror 26.

Further, the inner flanges 60 of the base bracket 40, the retention flanges 66 of the upper cover 42 and the outer flanges 80 of the lower cover 44 provide interlocking engagement between the base bracket 40, the upper cover 42 and the lower cover 44.

The various vehicle structures, other than the camera cover assembly 12, are conventional components that are well known in the art. Since vehicle structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle camera cover assembly. Accordingly, these terms, as utilized to describe the present invention should be interpreted relative to a vehicle equipped with the vehicle camera cover assembly.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle camera cover assembly, comprising
a base bracket having a windshield attachment surface and a cover attachment surface opposite the windshield attachment surface, the base bracket defining an opening dimensioned to encircle a base member of a rearview mirror, the cover attachment surface having an upper portion with a first attachment section, a lower portion with a second attachment section and midportion with an inner flange extending therefrom at a location spaced apart from the first attachment section and the second attachment section;
an upper cover having an upper attachment section that aligns with and attaches to the first attachment section, the upper cover having a retention flange extending from one end thereof dimensioned and positioned to overlay the inner flange of the base bracket with the upper cover attached to the base bracket; and
a lower cover having a lower attachment section that aligns with and removably connects to the second attachment section, the lower cover having an outer flange dimensioned and positioned such that with the upper cover and the lower cover installed to the base bracket, the outer flange covers and contacts the retention flange thereby confining the retention flange between the outer flange and the inner flange restricting movement of the upper cover relative to the lower cover and the base bracket.

2. The vehicle camera cover assembly according to claim 1, wherein
the base bracket, the upper cover and the lower cover define a longitudinal direction when attached to one another, and
the outer flange defines a flat surface contacting a first side of the retention flange and the inner flange defines another flat surface contacting a second side of the retention flange, and
the outer flange of the lower cover has main portion that extends in the longitudinal direction and a lateral side portion that extends away from the main portion curving around an outer lateral edge of the retention flange such that the main portion prevents movement of the retention flange and the upper cover in a direction going toward the lateral side portion of the outer flange.

3. The vehicle camera cover assembly according to claim 2, wherein
the upper cover includes at least one stop projection adjacent to the retention flange that contacts the inner flange of the base bracket preventing forward movement of the upper cover in the longitudinal direction.

4. The vehicle camera cover assembly according to claim 1, wherein
the upper cover includes at least one stop projection adjacent to the retention flange that contacts the inner flange of the base bracket limiting movement of the upper cover relative to the base bracket.

5. The vehicle camera cover assembly according to claim 1, wherein
the upper attachment section includes two doghouse structures and the upper attachment sections includes two projections dimensioned to snap-fit to the doghouse structures.

6. The vehicle camera cover assembly according to claim 1, wherein
the lower attachment section includes a plurality of doghouse structures and the lower attachment sections includes a plurality of projections corresponding to the plurality of doghouse structures, the plurality of projections being dimensioned to snap-fit to the doghouse structures.

7. A vehicle camera cover assembly, comprising
a base bracket having a windshield attachment surface and a cover attachment surface opposite the windshield attachment surface, the base bracket defining an opening dimensioned to encircle a base member of a rearview mirror, the cover attachment surface having an upper portion with a first attachment section, a lower portion with a second attachment section and midportion with a pair of inner flanges extending therefrom and spaced apart from one another with the opening located therebetween;
an upper cover having an upper attachment section that aligns with and attaches to the first attachment section, the upper cover having a pair of retention flanges extending from one end thereof dimensioned and positioned to overlay corresponding ones of the pair of inner flanges of the base bracket with the upper cover attached to the base bracket; and
a lower cover having a lower attachment section that aligns with and removably connects to the second attachment section, the lower cover having a pair of outer flanges dimensioned and positioned such that with the upper cover and the lower cover installed to the base bracket, the pair of outer flanges cover and contact corresponding ones of the pair of retention flanges thereby confining the pair of retention flanges between the corresponding ones of the pair of outer flanges and the corresponding ones of the inner flanges restricting movement of the upper cover relative to the lower cover.

8. The vehicle camera cover assembly according to claim 7, wherein each of the pair of inner flanges of the base bracket includes an extending portion that extends away from the attachment surface, and a pressing surface extending from a distal end of the extending portion in a direction parallel to the attachment surface, the pressing surfaces contacting respective ones of the pair of retention flanges.

9. The vehicle camera cover assembly according to claim 8, wherein the upper cover and lower cover extend in a longitudinal direction defined by the base bracket, the upper cover and the lower cover when attached to one another, the pair of outer flanges of the lower cover each have a main portion that is spaced apart from and extends in a direction parallel to the longitudinal direction and a lateral side portion that extends away from the main portion curving around an outer lateral edge of corresponding ones of the pair of retention flanges such that the outer lateral edge prevents movement of the retention flanges and the upper cover in a direction going toward the lateral side portion of the outer flange.

10. The vehicle camera cover assembly according to claim 9, wherein the upper cover includes a plurality of stop projections adjacent to the each of the pair of retention flanges that contacts the pair of inner flange of the base bracket preventing movement of the upper cover in the longitudinal direction relative to the base bracket.

11. The vehicle camera cover assembly according to claim 7, wherein the upper attachment section includes two doghouse structures and the upper attachment sections includes two projections dimensioned to snap-fit to the doghouse structures, and the lower attachment section includes a plurality of doghouse structures and the lower attachment sections includes a plurality of projections corresponding to the plurality of doghouse structures, the plurality of projections being dimensioned to snap-fit to the doghouse structures.

12. A vehicle camera cover assembly, comprising
a vehicle windshield;
a rear-view mirror having a base member fixed to the vehicle windshield;
a camera attached to the vehicle windshield proximate the base member of the rear-view mirror;
a base bracket fixed to the vehicle windshield with a portion of the base bracket encircling the base member of the rear-view mirror, the base bracket having an upper portion with a first attachment section, a lower portion with a second attachment section and a first inner flange;
an upper cover having an upper attachment section that aligns with and attaches to the first attachment section of the base bracket, the upper cover also defining a first retention flange; and
a lower cover having a lower attachment section that align with and removably connects to the second attachment section of the base bracket, the lower cover having a first outer flange dimensioned and positioned such that with the upper cover and the lower cover installed to the base bracket, the first outer flange covers and conceals the first retention flange of the upper cover, confining the first retention flange between the first outer flange and the first inner flange thereby restricting movement of the upper cover relative to the vehicle windshield and the lower cover, at least partially covering and concealing the camera.

13. The vehicle camera cover assembly according to claim 12, wherein the base bracket defines an attachment surface that is fixed to the vehicle windshield, the attachment surface being approximately planar, and the first inner flange of the base bracket includes a first extending portion that away from the attachment surface, and a first pressing surface extending from a distal end of the first extending portion in a direction parallel to the attachment surface, the first pressing surface contacting the first retention flange.

14. The vehicle camera cover assembly according to claim 12, wherein the upper cover and lower cover extend in a vehicle longitudinal direction when attached to the base bracket along with vehicle windshield, and the first outer flange of the lower cover has main portion that is spaced apart from and extends in a direction parallel to the vehicle windshield and a lateral side portion that extends from the main portion to the windshield such that the main portion prevents movement of the first retention flange of the upper cover in a direction away from the vehicle windshield, and the lateral side portion restricts lateral movement of the first retention flange of the upper cover in a direction parallel to the vehicle windshield.

15. The vehicle camera cover assembly according to claim 14, wherein the upper cover includes at least one stop projection adjacent to the first retention flange that contacts the first inner flange of the base bracket preventing forward movement of the upper cover in the vehicle longitudinal direction.

16. The vehicle camera cover assembly according to claim 12, wherein the upper cover includes at least one stop projection adjacent to the first retention flange that contacts the first inner flange of the base bracket limiting movement of the upper cover relative to the base bracket.

17. The vehicle camera cover assembly according to claim 12, wherein the base bracket includes a second inner flange spaced apart from the first inner flange, the upper cover includes a second retention flange spaced apart from the first retention flange; and the lower cover includes a second outer flange, with the second inner flange, the second retention flange and the second outer flange being positioned such that the second outer flange covers and conceals the second retention flange, confining the second retention flange between the second outer flange and the second inner flange thereby further restricting movement of the upper cover relative to the vehicle windshield and the lower cover.

18. The vehicle camera cover assembly according to claim 12, further comprising a rain sensor attached to the vehicle windshield proximate the camera and the base member of the rear-view mirror such that one of the upper cover and the lower cover covers and conceals the rain sensor.

19. The vehicle camera cover assembly according to claim 18, wherein
the rain sensor includes an attachment bracket that is fixed to the vehicle windshield, with the rain sensor snap-fitted to the attachment bracket.

20. The vehicle camera cover assembly according to claim 12, wherein
the upper attachment section includes two doghouse structures and the upper attachment sections includes two projections dimensioned to snap-fit to the doghouse structures, and
the lower attachment section includes a plurality of doghouse structures and the lower attachment sections includes a plurality of projections corresponding to the plurality of doghouse structures, the plurality of projections being dimensioned to snap-fit to the doghouse structures.

* * * * *